(12) United States Patent
Muggeo et al.

(10) Patent No.: US 8,530,765 B2
(45) Date of Patent: Sep. 10, 2013

(54) HYBRID VEHICLE HIGH VOLTAGE MULTIPLE BATTERY DISCONNECT

(75) Inventors: Filippo Muggeo, Endwell, NY (US); Dan Snavely, Binghamton, NY (US); Derek Matthews, Vestal, NY (US); Brendan Pancheri, Binghamton, NY (US); Jurgen Schulte, Vestal, NY (US)

(73) Assignee: BAE Systems Controls Inc., Johnson City, NY (US)

( * ) Notice: Subject to any disclaimer, the term of this patent is extended or adjusted under 35 U.S.C. 154(b) by 351 days.

(21) Appl. No.: 12/950,417

(22) Filed: Nov. 19, 2010

(65) Prior Publication Data
US 2012/0125746 A1    May 24, 2012

(51) Int. Cl.
  *H01H 3/00*  (2006.01)
  *H01M 2/10*  (2006.01)
(52) U.S. Cl.
  USPC .............. 200/1 R; 200/17 R; 200/18; 429/97
(58) Field of Classification Search
  USPC  200/1 R, 16 R–16 D, 17 R, 18, 48 R–48 CB, 200/50.32, 537, 547, 549, 550, 252, 258, 200/275, 284, 334; 307/43, 52, 53, 54, 60, 307/63, 77, 78, 85; 429/7, 97
  See application file for complete search history.

(56) References Cited

U.S. PATENT DOCUMENTS

| | | | | |
|---|---|---|---|---|
| 3,327,169 A | * | 6/1967 | Comstock, Jr. et al. | 361/615 |
| 3,673,364 A | * | 6/1972 | Klein | 200/16 C |
| 4,316,064 A | * | 2/1982 | Fujino | 200/17 R |
| 4,644,112 A | * | 2/1987 | Kranich, II | 200/16 F |
| 5,206,538 A | | 4/1993 | Orta | |
| 5,347,096 A | * | 9/1994 | Bolongeat-Mobleu et al. | 218/84 |
| 5,508,480 A | * | 4/1996 | Quinlan | 200/16 A |
| 5,534,364 A | * | 7/1996 | Watanabe et al. | 429/61 |
| 5,744,764 A | * | 4/1998 | Aschenbrenner et al. | 200/1 R |
| 5,942,737 A | * | 8/1999 | Waters et al. | 200/50.28 |
| 7,301,249 B2 | | 11/2007 | Stranberg et al. | |
| 7,573,151 B2 | | 8/2009 | Acena et al. | |
| 7,990,105 B2 | * | 8/2011 | Matsumoto et al. | 320/120 |
| 8,198,750 B2 | * | 6/2012 | Svensson et al. | 307/9.1 |
| 2008/0306643 A1 | | 12/2008 | Hanyu et al. | |
| 2009/0023053 A1 | | 1/2009 | Berdichevsky et al. | |
| 2009/0038918 A1 | * | 2/2009 | Korner | 200/18 |
| 2009/0166333 A1 | * | 7/2009 | Marquezin et al. | 218/154 |
| 2011/0135984 A1 | * | 6/2011 | Ekchian | 429/97 |

FOREIGN PATENT DOCUMENTS
EP    0 451 110 A2    10/1991

* cited by examiner

*Primary Examiner* — Edwin A. Leon
(74) *Attorney, Agent, or Firm* — Scully, Scott, Murphy & Presser PC

(57) ABSTRACT

An apparatus for selectively connecting and disconnecting a high voltage source includes a mechanical actuator including a plurality of stations. Each station includes connection elements that are electrically connectable to one or more corresponding high voltage modules which are part of a plurality of high voltage modules. The plurality of high voltage modules are electrically connectable to each other. The mechanical actuator has a connected position and a disconnected position for simultaneously electrically connecting each of the plurality of high voltage modules to each other, and for simultaneously electrically disconnecting each of the plurality of high voltage modules from each other.

15 Claims, 3 Drawing Sheets

HYBRID VEHICLE HIGH VOLTAGE MULTIPLE BATTERY DISCONNECT

FIELD OF THE INVENTION

The present invention generally relates to an electrical disconnect system, and more specifically, a high voltage (HV) disconnect system for multiple HV modules.

BACKGROUND OF THE INVENTION

Known energy storage systems (ESS) may include a plurality of power modules, for example, a plurality of batteries. The batteries may have a combined Voltage of 300 VDC or greater. In one instance, hybrid vehicles may use energy storage systems having a high combined voltage. For example, to service a 600 VDC battery pack, a trained engineer or technician needs to wear a flame retardant suit, a face shield, high voltage gloves and other safety equipment. One disadvantage of current energy storage systems is the technician is at risk of injury when servicing the ESS, and the safety measures are expensive, and time consuming.

It would therefore be desirable to provide an apparatus or system for reducing the high voltage in an ESS to a low voltage to eliminate the risk to a service person, and reduce the cost and time required to service the ESS.

SUMMARY OF THE INVENTION

In an aspect of the invention, an apparatus for selectively connecting and disconnecting a high voltage source includes a mechanical actuator including a plurality of stations. Each station includes connection elements that are electrically connectable to one or more corresponding high voltage modules which are part of a plurality of high voltage modules. The plurality of high voltage modules are electrically connectable to each other. The mechanical actuator has a connected position and a disconnected position for simultaneously electrically connecting each of the plurality of high voltage modules to each other, and for simultaneously electrically disconnecting each of the plurality of high voltage modules from each other.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION OF THE INVENTION

Figure 3:
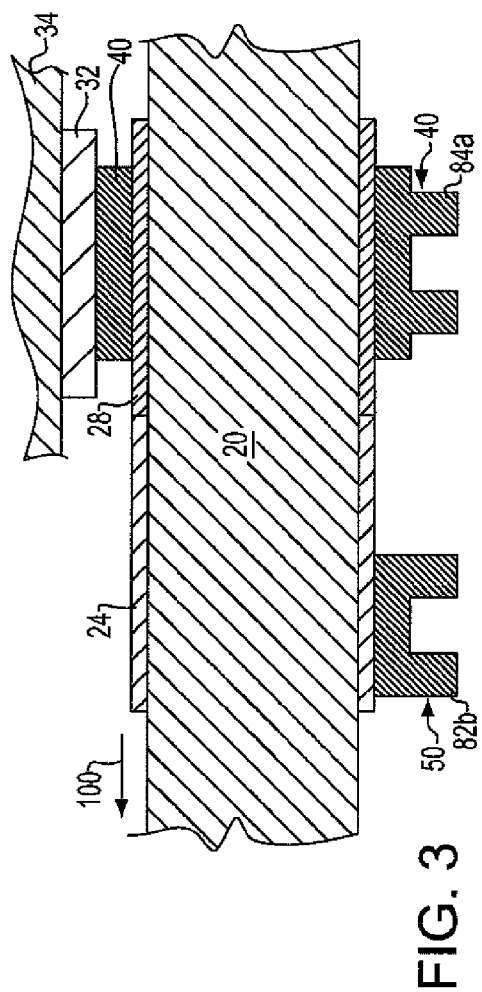
FIG. 3 is a cross sectional side elevational view of the mechanical actuator of FIG. 1, in the disconnected position.
Figure 4:
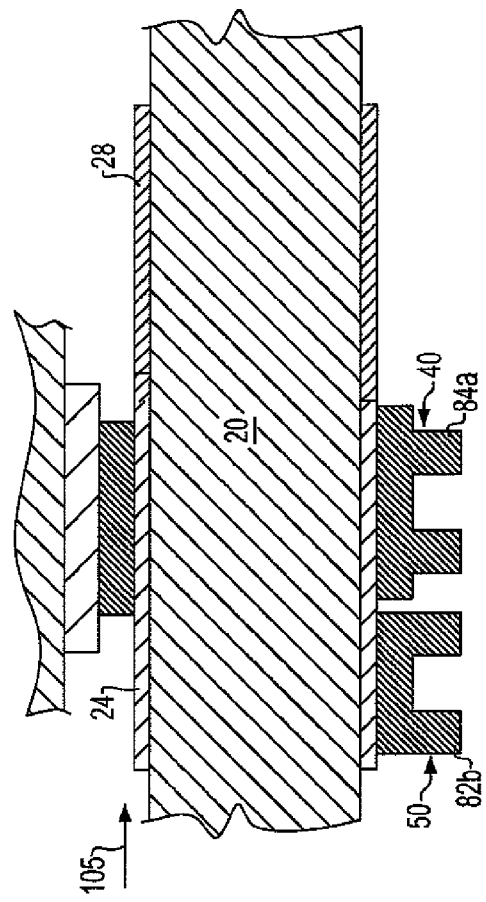
FIG. 4 is a cross sectional side elevational view of the mechanical actualtor as shown in FIG. 2, in the connected position.
Figure 5:
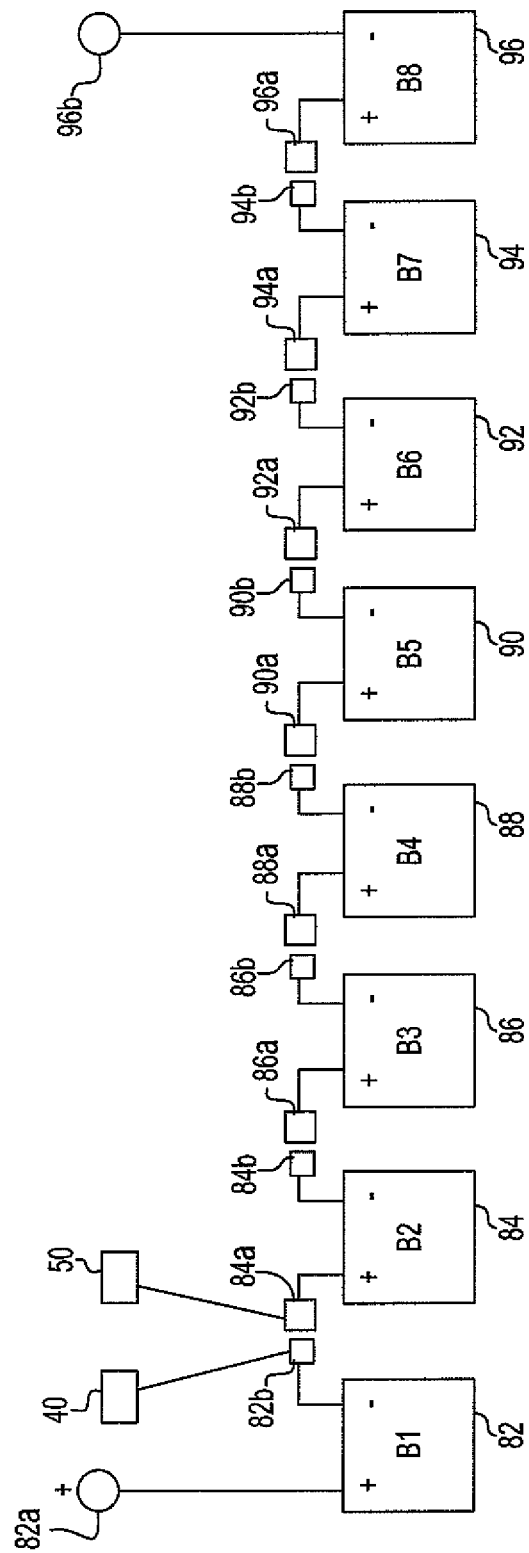
FIG. 5 schematic block diagram of a plurality of batteries for connection in series comprising an energy storage system.

Referring to FIGS. 1-5, an apparatus and system according to an embodiment of the invention includes a mechanical actuator 10 for selectively connecting and disconnecting a series of electrically communicating modules, embodied as a plurality of high voltage (HV) batteries 82-96. The high voltage batteries 82-96 are connected in series, as shown in FIG. 5. The mechanical actuator 10 includes a plurality of stations 14. Each station 14 including connection elements, that is, a positive connection element 40 and a negative connection element 50. The connection elements 40, 50 are electrically connectable to corresponding high voltage batteries, for example, batteries 82, 84.

Figure 2:
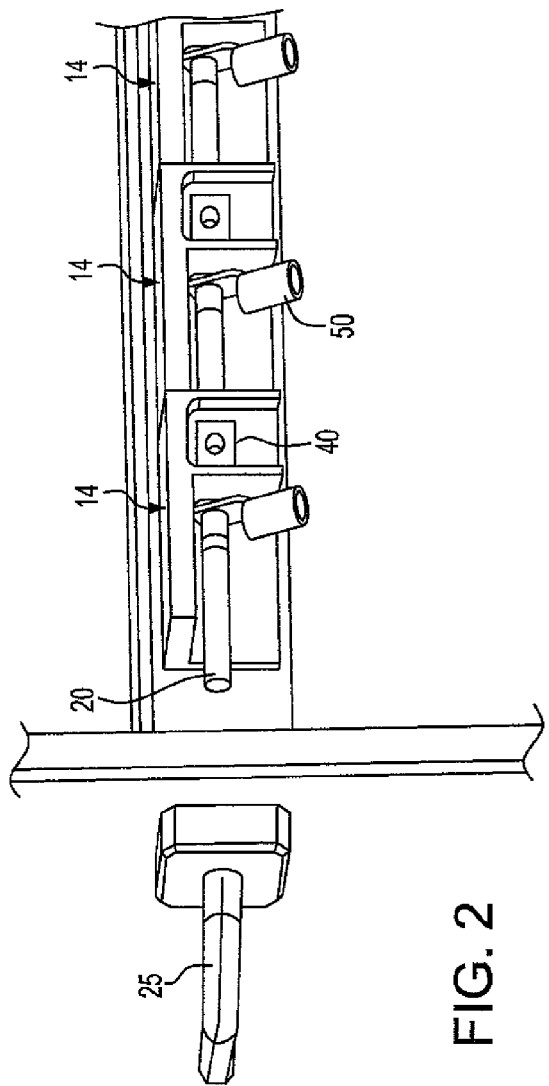
FIG. 2 is an isometric view of the mechanical actuator shown in FIG. 1 in a connected position.
Figure 1:
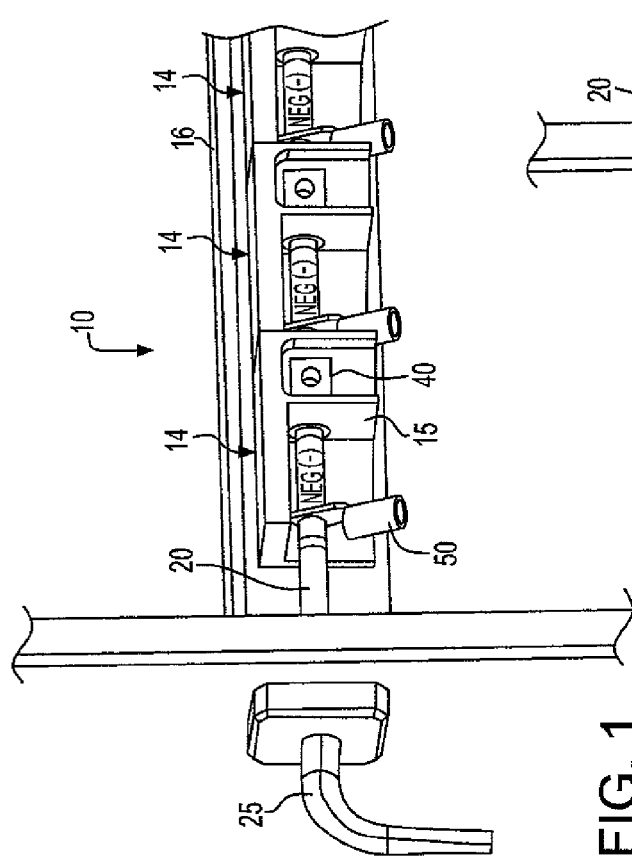
FIG. 1 is an isometric view of a mechanical actuator according to an embodiment of the invention, in a disconnected position.

The mechanical actuator 10 includes a sliding mechanism embodied as a moveable elongated bar 20. The moveable elongated bar 20 is comprised of a nonconductive insulating material, for example, plastic, glass, Teflon®, rubber products, and ceramics. The rod 20 is connected to a handle 25 at a distal end of the rod 20. The elongated bar 20 moves to slidably engage the plurality of stations 14 which are stationary and may be affixed to a structure 16. The moveable bar 20 interacts with the stationary stations 14 such that the conductivity between each of the high voltage batteries 82-96 is manually and selectively connectable and disconnectable. The bar 20 of the mechanical actuator 10 moves between a disconnected position, as shown in FIG. 1, to a connected position, as shown in FIG. 2 with the handle 25 in a locked position. The stations 14 may include a housing 15 partially enclosing the positive connection element 40.

More specifically, as shown in FIGS. 3 and 4, the bar 20 is in the disconnected position, as shown in FIG. 3, and the bar 20 is slidably moved into the connected position in FIG. 4. A conductive sleeve 24 is positioned over the elongated bar 20, which is adjacent to a nonconductive sleeve 28 also positioned over the elongated bar 20. The conductive sleeve may be comprised of conductive material, for example, copper, aluminum or stainless steel. The nonconductive sleeve may be comprised of nonconductive materials, for example, plastic, glass, Teflon, rubber products, and ceramics. The elongated rod 20 of the mechanical actuator 10 slidably moves to the disconnected position 100, as shown in FIGS. 1 and 3, and moves to the connected position 105, as shown in FIGS. 2 and 4. As is apparent from FIGS. 3 and 4, the conductive and nonconductive sleeves 24, 28 move with the elongated bar 20. Further, the conductive and nonconductive sleeves 24, 28 align with the stations 14 to provide electrical connectivity, or electrical insulation between the connected battery terminals at each station 14. Specifically, in one example for illustrative purposes, batteries 82 and 84, include a negative battery terminal 82b from battery 82 and a positive battery terminal 84a from battery 84, as shown in FIG. 5. The positive battery terminal 84a is connected to the positive connection element 40, and the negative battery terminal 82b is connected to the negative connection element 50 as shown in FIGS. 3-5.

An insulator structure 32 is fixedly positioned, for example, to a wall 34, as shown in FIGS. 3 and 4. The insulator structure 32 mates with the positive connection element 40, which is bifurcated by the elongated bar 20. The negative connection element 50 is fixedly attached to the elongated bar 20, and thereby moves with the bar 20. Referring to FIG. 5, the plurality of batteries 82-96 are connected in series such that each battery 82-96 is connected to the mechanical actuator 10 as shown in FIGS. 3-5 regarding the connection elements 40, 50. Output terminals 82a, 96b of the last batteries 82, 96 of the plurality of batteries are the end of the series of batteries, wherein the batteries 82-96 may comprise an energy storage system (ESS).

Referring to FIGS. 3 and 4, in operation, when the elongated bar 20 is in position 100 in FIG. 3, the nonconductive sleeve 28 electrically insulates the electrical connection 40 from the electrical connection 50 causing an electrical break at each station via the nonconductive sleeve 28, and thereby at each battery connected to the stations. When the elongated bar 20 is moved to position 105 in FIG. 4, the conductive sleeve 24 provides electrical continuity between the electrical connections 40, 50, and thereby the battery terminals 82b and 84a via the conductive sleeve 24. Thus, battery terminals (e.g., 82b, 84a) in the series of batteries 82 96, are connected to the connection elements (e.g., 50, 40), respectively, and are simultaneously connected and disconnected for each battery at positions 105 and 100, respectively. The connection between connection elements 50 and 40 and battery terminal 82b and 84a, respectively, are shown for illustrative purposes in FIGS. 3 and 4.

As described above, each of the batteries 82-96 are individually connected to the stations 14 and movable bar 20. Therefore, when the movable bar 20 is moved to the disconnect position 100, each of the batteries 82-96 are disconnected from the next battery in the series of the plurality of batteries 82-96. This not only ensures that the batteries are disconnected from the voltage source, but also ensures that no more than 50 volts is present in any HV module, i.e., batteries 82-96 when each module has a maximum of 50 volt power supply. Additionally, the apparatus 10 accomplishes the above for all the batteries 82-96 simultaneous. The foregoing ensures that the individual batteries 82-96 are safe to work on by a technician. More specifically, the present invention allows a total voltage, for example, 300 V DC or greater, in an ESS 80 to be broken down to the voltage at each of the modules, for example, 50 V DC or less. One advantage of the above is that a technician can safely work on the ESS 80 at the modular level, that is, each battery 82-96, as the apparatus 10 ensures that only the nominal voltage is present at each module, for example, 50 V DC or less. Thereby, the voltage of the ESS 80 can be reduced from high voltage to low voltage levels that make the ESS field replaceable at the battery module level. The apparatus 10 uses mechanical actuation of the elongated bar 20 to enable a safe maintenance environment by disconnecting the batteries from each other. Specifically, referring to FIG. 5, using the apparatus 10, when the elongated bar 20 is in the disconnected position 100, the series of battery connections are broken such that B1 (−) 82b is disconnected from B2 (+) 84a, and B2 (−) 84b is disconnected from B3 (+) 86a, etc.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. An apparatus for selectively connecting and disconnecting a high voltage source, comprising:
    a mechanical actuator including a plurality of stations, each station including connection elements being electrically connectable to one or more corresponding high voltage modules of a plurality of high voltage modules, the plurality of high voltage modules being electrically connectable to each other;
    a sliding mechanism being part of the mechanical actuator, the sliding mechanism including an elongated bar connected to a distal handle, the elongated bar slidably engaging the plurality of stations, each of the stations having a positive and negative connection element being connected to corresponding positive and negative terminals on corresponding high voltage modules, and
    the mechanical actuator having a connected position and a disconnected position for simultaneously electrically connecting each of the plurality of high voltage modules to each other, and for simultaneously electrically disconnecting each of the plurality of high voltage modules from each other.

2. The apparatus of claim 1, wherein the positive connection elements of the stations are affixed to a ground terminal, and the negative connection elements of the stations are affixed to the elongated bar and move between the connected position and the disconnected position.

3. The apparatus of claim 1, wherein the plurality of high voltage modules are in series; and
    wherein the positive terminal of the modules are connected to the positive connection element of the station, and the negative element of a next module in the series of modules is connected to the negative connection element of the same station.

4. The apparatus of claim 1, wherein the plurality of high voltage modules are in series; and
    a positive terminal of a first module of the plurality of modules being connected to a positive connection element of a first station, and a negative terminal of a second module of the plurality of modules being a next module in the series of modules being connected to a negative connection element of the first station; and
    a positive terminal of the second module being connected to a positive connection element of a second station, and a negative terminal of a third module of the plurality of modules being a next module in the series of modules being connected to a negative connection element of the second station.

5. The apparatus of claim 1, further comprising:
    a conductive sleeve being positioned circumferentially over first portions of the elongated bar being in spaced relation to each other and corresponding with each of the stations; and
    an nonconductive sleeve being positioned circumferentially over second portions of the elongated bar being in spaced relation to each other and corresponding with each of the stations, the conductive sleeves being adjacent to the nonconductive sleeves;
    wherein the connected position of the mechanical actuator includes the conductive sleeve being in electrical contact with corresponding positive and negative connection elements of the modules to provide electrical continuity when the mechanical actuator is in the connected position; and
    wherein the disconnected position includes the nonconductive sleeve being in electrical contact with the corresponding positive and negative connection elements of the modules to provide electrical insulation when the mechanical actuator is in the disconnected position, providing electrical discontinuity between the corresponding module and the station for disconnecting adjacent modules.

6. The apparatus of claim 1, wherein the conductive sleeve is comprised of electrically conductive material including one or more of: copper, aluminum or stainless steel.

7. The apparatus of claim 1, wherein the nonconductive sleeve is comprised of electrically insulating material including one or more of: plastic, glass. Teflon®, rubber products, and ceramics.

8. The apparatus of claim 1, wherein the elongated bar provides electrical insulation.

9. The apparatus of claim 1, wherein the elongated bar is comprised of a nonconductive material including one or more of: plastic, glass, Teflon®, rubber products, and ceramics.

10. The apparatus of claim 1, wherein the high voltage modules are battery modules.

11. A system for selectively connecting and disconnecting a high voltage source, comprising:
- a plurality of high voltage modules being configured to be electrically connectable to each other;
- a mechanical actuator including a plurality of stations, each station including connection elements and being electrically connected to corresponding high voltage modules of the plurality of high voltage modules;
- a sliding mechanism being part of the mechanical actuator, the sliding mechanism including an elongated bar connected to a distal handle, the elongated bar slidably engaging the plurality of stations, each of the stations having a positive and negative connection element being connected to corresponding positive and negative terminals on corresponding high voltage modules, and
- the mechanical actuator having a connected position and a disconnected position for simultaneously electrically connecting each of the plurality of high voltage modules to each other, and for simultaneously electrically disconnecting each of the plurality of high voltage modules from each other.

12. The system of claim 11, wherein the plurality of high voltage modules are in series; and
wherein the positive terminal of the modules are connected to the positive connection element of the station, and the negative terminal of a next module in the series of modules is connected to the negative connection element of the same station.

13. The system of claim 11, wherein the plurality of high voltage modules are in series; and
- a positive terminal of a first module of the plurality of modules being connected to a positive connection element of a first station, and a negative terminal of a second module of the plurality of modules being a next module in the series of modules being connected to a negative connection element of the first station; and
- a positive terminal of the second module being connected to a positive connection element of a second station, and a negative terminal of a third module of the plurality of modules being a next module in the series of modules being connected to a negative connection element of the second station.

14. A method for selectively connecting and disconnecting a high voltage source, comprising:
- electrically connecting a plurality of electrically connectable high voltage modules to a mechanical actuator including a plurality of stations;
- initiating a connected position of the mechanical actuator for simultaneously electrically connecting each of the plurality of high voltage modules to each other;
- slidably moving a sliding mechanism being part of the mechanical actuator for electrically engaging the plurality of stations using an elongated bar being part of the sliding mechanism;
- connecting each of the stations to corresponding high voltage modules using corresponding positive and negative connection elements on the stations and modules; and
- initiating a disconnected position of the mechanical actuator for simultaneously electrically disconnecting each of the plurality of high voltage modules from each other.

15. The method of claim 14, further comprising:
- positioning a conductive sleeve circumferentially over first portions of the elongated bar being in spaced relation to each other and corresponding with each of the stations; and
- positioning a nonconductive sleeve circumferentially over second portions of the elongated bar being in spaced relation to each other and corresponding with each of the stations, the conductive sleeves being adjacent to the nonconductive sleeves;
- moving the mechanical actuator into the connected position such that the conductive sleeve is in electrical contact with corresponding positive and negative connection elements of the modules to provide electrical continuity; and
- moving the mechanical actuator in the disconnected position such that the nonconductive sleeve is in electrical contact with the corresponding positive and negative connection elements of the modules to provide electrical insulation between the corresponding module and the station for disconnecting adjacent modules.

* * * * *